No. 721,033. PATENTED FEB. 17, 1903.
O. R. GOULD.
TIRE TIGHTENER.
APPLICATION FILED JUNE 18, 1902.
NO MODEL.
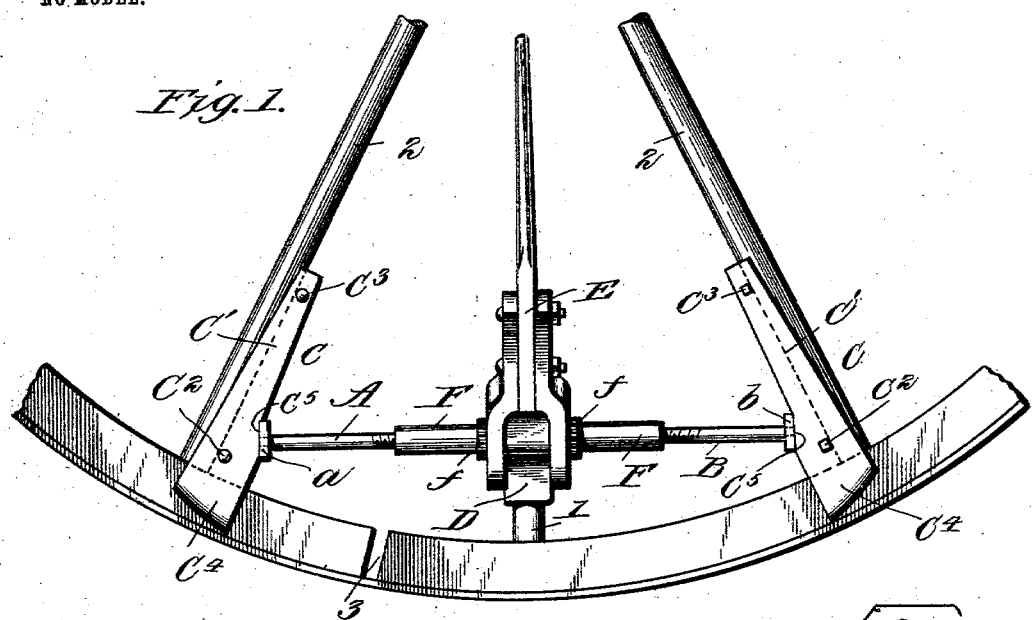
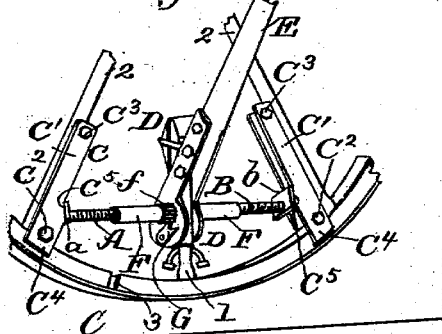
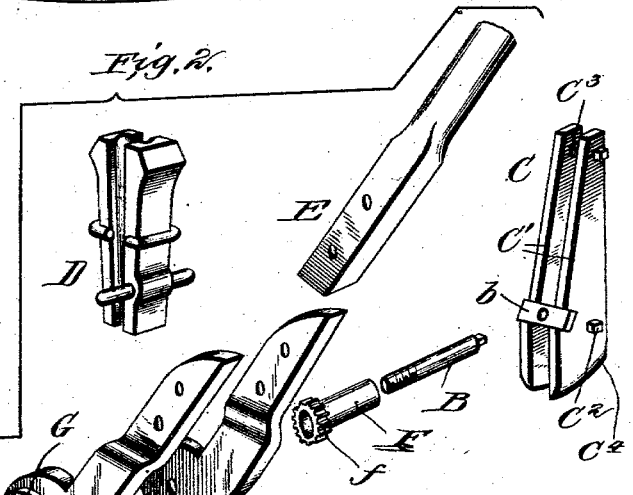
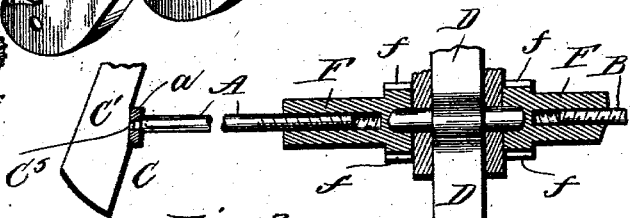
WITNESSES:
INVENTOR
Otin R. Gould.
BY Munn & Co.
ATTORNEYS.

UNITED STATES PATENT OFFICE.

OLIN R. GOULD, OF MARION, IOWA.

TIRE-TIGHTENER.

SPECIFICATION forming part of Letters Patent No. 721,033, dated February 17, 1903.

Application filed June 18, 1902. Serial No. 112,180. (No model.)

*To all whom it may concern:*

Be it known that I, OLIN R. GOULD, a citizen of the United States, and a resident of Marion, in the county of Linn and State of Iowa, have made certain new and useful Improvements in Tire-Tighteners, of which the following is a specification.

My invention is an improvement in tire-tighteners, and has for an object, among others, to provide a simple construction whereby the felly can be tightened within the tire by spreading the felly-sections; and the invention consists in certain novel constructions and combinations of parts, as will be hereinafter described and claimed.

In the drawings, Figure 1 is a perspective view of my invention as in use, and Fig. 2 is a detail perspective view showing the improved tire-tightening device removed from the wheel. Fig. 3 is a detail sectional elevation through the operating device, and Fig. 4 is a detail perspective view of the tightener as in use.

By my invention I provide an improved tightening device which can be applied to the wheel to operate upon the spokes to spread the felly and provide an opening between adjacent ends of the felly-sections, as shown in Fig. 1, which can be filled to tighten the wheel within the tire.

In the construction shown I employ screws A and B, head-plates $a$ and $b$ at the outer ends thereof, bearing-frames C and an intermediate supporting-frame D, a lever, E and nut-sections F, having gear-wheels $f$, engaged by the pawl G on the lever E, the nut-sections F being journaled to the main frame D, and the latter being secured to a spoke 1, intermediate the spokes 2, to which the bearing-frames C are applied. The bearing-frames C are of a special construction and consist each of the two opposite side plates C', connected by the inner and outer bolts $C^2$ and $C^3$ and lapping at their sides slightly along the spokes 2 and at their outer ends on opposite sides of the rim of the wheel, as shown at $C^4$ in Fig. 1. The plates C' are provided comparatively near the outer bolts $C^2$ with inclined surfaces $C^5$, and each of the head-plates $a$ and $b$ is applied in the operation of the device as shown in Fig. 1, the screws A operating to press the bearing-frames C apart and so spread the felly-joint at 3, as shown in Fig. 1.

The main frame D is applied to the spoke 1 and secured thereon as shown. It is preferred to make the frame D in sections fitting on opposite sides of the spoke 1 and secured, as thereby I provide a firm anchorage and support for the lever, the nuts, and the bolts, as will be understood from Fig. 1.

In the operation of the device the bearing-plates $a$ and $b$ may be drawn toward each other by the operation of the lever and the frames C be applied to the spokes 2, the frame D applied to the spoke 1, and the parts adjusted and operated to the position shown in Fig. 1, thus spreading the wheel-rim, and opening one of the joints, which may be filled as desired.

Having thus described my invention, what I claim as new, and desire to secure by Letters Patent, is—

1. The tire-tightener herein described consisting of the bearing-frames having the opposite side plates and the bolts connecting the same and constructed at their outer sides to overlap the spokes and at their outer ends to overlap the rim of the wheel and having such side plates provided with inclined surfaces forming seats for the head-plates of the bolts, the bolts or screws and their head-plates, the nut-sections and the lever and pawl-and-gear mechanism for operating the same, and the main frame arranged intermediate the bearing-frames, substantially as and for the purposes set forth.

2. A tire-tightener comprising a main frame, the opposite bearing-frames, the opposite screws, the nuts operating upon said screws and having ratchet-wheels on opposite sides of the main frame, and the lever provided on opposite sides of the main frame with pawls engaged with their respective ratchet-wheels substantially as set forth.

OLIN R. GOULD.

Witnesses:
   I. E. GOULD,
   F. W. KELLEY.